July 4, 1944. W. T. BRADBURY 2,352,613
OVEN BROILER
Filed March 28, 1941
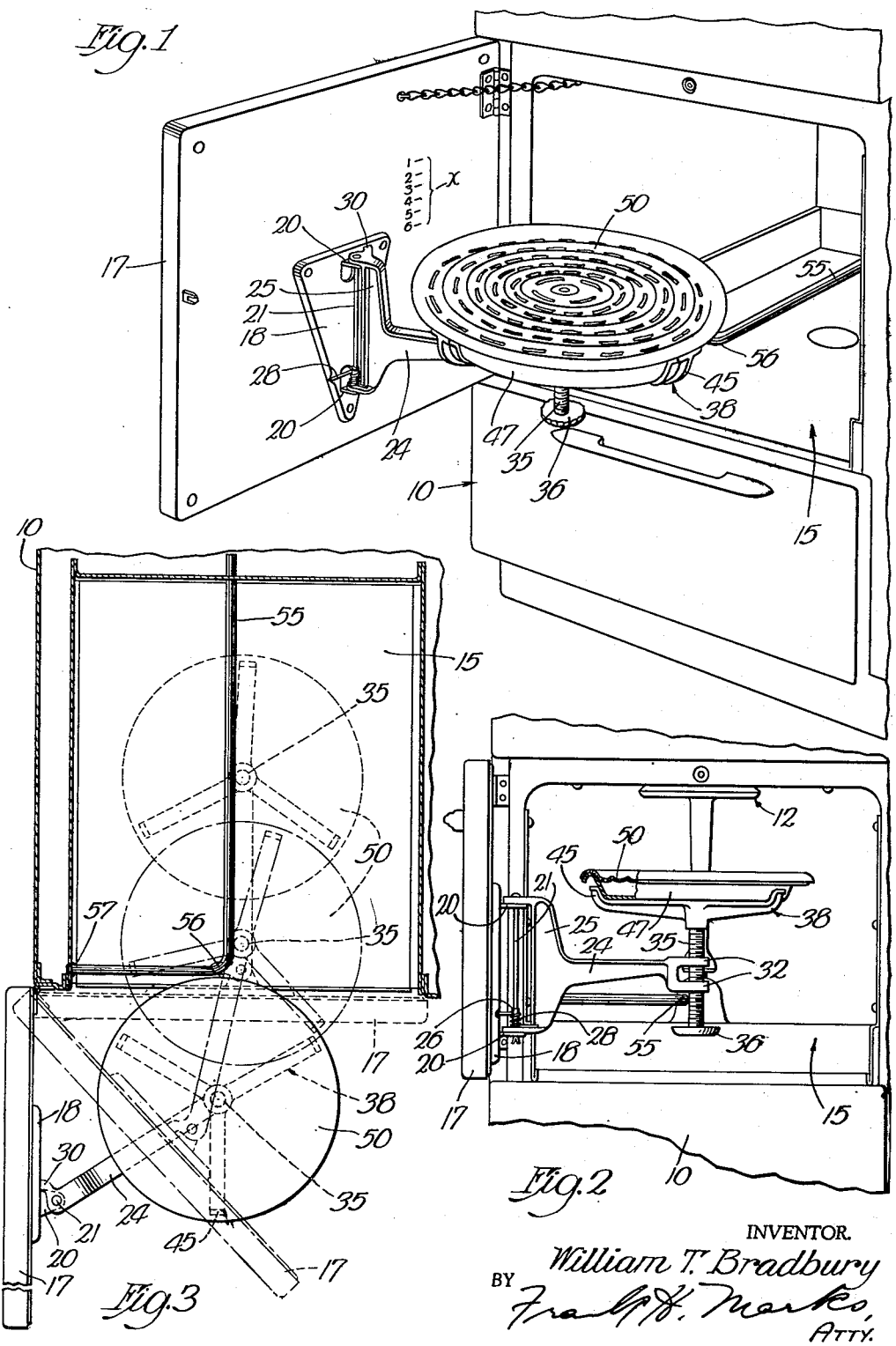
INVENTOR.
William T. Bradbury
BY
ATTY.

Patented July 4, 1944

2,352,613

UNITED STATES PATENT OFFICE 2,352,613

OVEN BROILER

William T. Bradbury, Millersport, Ohio, assignor to Newark Stove Company, Newark, Ohio, a corporation of Ohio Application March 28, 1941, Serial No. 385,585

10 Claims. (Cl. 126—338)

My invention relates to oven broilers, as used in connection with a stove or range, and has particularly to do with an improved arrangement for supporting the food to be cooked in such a device.

An object of my invention is to provide, in combination with a broiler, supporting means carried by the door of the oven and so disposed that the food will be properly positioned in the oven for most efficient cooking when the door is closed, while, when the door is opened, the food is withdrawn from the oven and disposed in a readily accessible position.

Another object is to provide such an arrangement which will be simple and inexpensive in construction, easily manipulated, substantially foolproof in operation, and, in general, entirely satisfactory for the purposes desired.

Various other objects and advantages will suggest themselves to those skilled in the art as the description proceeds.

Referring to the drawing forming a part of this specification and showing a preferred embodiment of my invention:

Fig. 1 is a perspective view of an oven and associated parts embodying my invention;

Fig. 2 is a front elevational view of the same; and

Fig. 3 is a top plan view thereof, with the oven shown in cross section.

Numeral 10 indicates a stove or range which may be heated by any desired medium but in the embodiment shown is constructed for use with gas, a burner 12 being provided within the oven indicated generally by the numeral 15.

The front of the oven is closed by means of a hinged door 17 which may be of standard or other suitable design, on the inside of which is secured a bracket 18. This bracket is provided with a pair of spaced outstanding ears 20, 20, which are apertured to receive a pintle 21 which serves as a bearing for supporting arm 24. This supporting arm has a bifurcated end 25 through which extends the pintle 21. One end of the bifurcated portion of the arm 24 is provided with a sleeve 26 journaled on pintle 21 and about this sleeve is coiled a spring 28 which, by reacting against the bracket 18, urges the arm inwardly, i. e., in a counterclockwise direction as seen in Fig. 3. The opposite end of the bifurcated portion 25 of the arm 24 is provided with a lug 30 which serves as a stop to limit such inward movement.

Opposite the bifurcated portion 25, the arm 24 is bifurcated to provide a pair of threaded sleeves 32, 32. Although a single sleeve could be used here, the spaced sleeves which I have provided give added strength and rigidity. Threaded in the sleeves 32 is a screw 35 having on its lower portion a handle or knob 36, preferably of non-heat conducting material such as Bakelite or the like, and having fixed to the upper portion thereof a spider-like pan support 38. This pan support may be of any suitable construction, having an axial threaded socket receiving the screw 35 and a plurality of radial arms terminating in upwardly extending fingers 45. A pan 47 is carried by the spider and over this pan is disposed a perforated grill 50.

Within the oven 15 is secured a rod 55, this rod being positioned above the bottom and in a plane parallel thereto and having the major portion thereof extending parallel to one side of the oven. This rod may be bent adjacent the front of the oven to form a rounded corner 56, the end being secured to the side wall of the oven as at 57, the opposite end of the bar being secured to the back of the oven in the same or other suitable manner (not shown).

Adjacent the bracket 18 a plurality of indicia is provided on the door, indicated collectively at X (Fig. 1). These indicia inform the cook how to adjust the grill 50 according to the nature of the food to be cooked, so that it may have proper space relation to the burner 12. Thus, certain foodstuffs which are quickly cooked and might be readily subject to burning, such as, for example, fish, should be well spaced from the source of heat, whereas other foods which require long cooking and are not so readily scorched, such as pork, should have a different space relation to the source of heat. Hence, with proper instructions furnished to the operator, the support may, by manipulation of screw 35, be given its optimum position for most efficient cooking.

The food support having been given its proper elevation with the oven door open, the food is placed on the grill 50 and the door closed, upon which operation the screw 35 engages the rod 55, which serves as a guide to maintain the food support in the central portion of the oven as the door continues to close, as best seen in Fig. 3, where a plurality of such positions are shown for open, intermediate and closed positions of the door. After cooking, the door is opened and the food is automatically presented at a readily accessible position for basting, removal, etc., the pan 47 catching all of the juice which has run through the grill 50 in the course of the cooking.

Various modifications may suggest themselves to those skilled in the art without departing from the spirit of my invention, and, hence, I do not wish to be restricted to the specific form shown or uses mentioned, except to the extent indicated in the appended claims.

I claim:

1. In combination, an oven having a heat source in cooperative relation therewith and having a door hinged at one side thereof, food supporting means mounted on the inside of said door for pivotal movement about a vertical axis, means resiliently urging said food supporting means toward the hinged side of said door, means for limiting the movement of said food supporting means in response to said resilient means when the door is open, whereby the food will be readily accessible at such time, and means disposed within the oven for limiting movement of said food supporting means toward said hinged side and guiding it to a position in cooperative relation with said heat source when the door is closed.

2. In combination, an oven having a heat source in cooperative relation therewith and having a door hinged at one side thereof, an arm mounted on the inside of said door for movement about a vertical axis, resilient means normally urging said arm toward the hinged side of said door, means for limiting the movement of said arm in response to said resilient means, means for supporting food carried by the free end of said arm and mounted for vertical adjustment thereon, and a rod extending in a direction from front to rear on a side wall of said oven for guiding said food supporting means to a position in proper cooperative relation to the heat source when the oven door is closed.

3. In combination, an oven having a heat source in cooperative relation therewith and having a door hinged at one side thereof, an arm mounted on the inside of said door for movement about a vertical axis, resilient means normally urging said arm toward the hinged side of said door, means for limiting the movement of said arm in response to said resilient means when the door is open, a food carrier, screw means supporting said food carrier threaded to the free end of said arm and having a heat insulated manipulating member, and means fixed within said oven for guiding said food carrier in a horizontal plane to a position in proper cooperative relation to the heat source when said door is closed.

4. In combination, an oven having a heat source in cooperative relation therewith and having a door hinged at one side thereof, a food supporting element mounted on the inside of said door for lateral swinging movement and biased in one direction means for vertically adjusting said food supporting element, and means mounted in said oven and toward which said element is biased for guiding said element during the closing of said door to a position in proper cooperative relation to the heat source when the door is closed.

5. In combination, an oven having a heat source in cooperative relation therewith and having a door hinged at one marginal side thereof, food supporting means mounted on the inside of said door for pivotal movement about a vertical axis, means resiliently urging said food supporting means toward the hinged side of said door, and means disposed within the oven for limiting movement of said food supporting means toward said hinged side and guiding it to a position in cooperative relation with said heat source when the door is closed.

6. In combination, an oven having a heat source in cooperative relation therewith and having a door hinged at one marginal side thereof, food supporting means mounted on the inside of said door for movement about a vertical axis, resilient means normally urging said food supporting means toward the hinged side of said door, and a rod extending in a direction from front to rear of said oven for guiding said food supporting means to a position in proper cooperative relation to the heat source when the oven door is closed.

7. In combination, an oven having a heat source in cooperative relation therewith and having a door hinged at one side thereof, a food supporting element mounted on the inside of said door for lateral swinging movement and biased in one direction, means for vertically adjusting said food supporting element, means mounted in said oven and toward which said element is biased for guiding said element during the closing of said door to a position in proper cooperative relation to the heat source when the door is closed, and means limiting the swing of said element in said direction when said door is open.

8. In combination, an oven having a heat source in cooperative relation therewith and having a door hinged at one side thereof, a food supporting element mounted on the inside of said door for lateral swinging movement and biased in one direction, means for vertically adjusting said food supporting element, means mounted in said oven and toward which said element is biased for guiding said element during the closing of said door to a position in proper cooperative relation to the heat source when the door is closed, means limiting the swing of said element in said direction when said door is open, the mounting for said supporting element including screw means for vertically adjusting said element relative to said heat source, and a handle for manipulating said screw means.

9. In combination, an oven having a heat source in cooperative relation therewith and having a door hinged at one side thereof, a food supporting element mounted on the inside of said door for lateral swinging movement and biased in one direction, and means mounted in said oven and toward which said element is biased for guiding said element during the closing of said door to a position in proper cooperative relation to the heat source when the door is closed.

10. In combination, an oven having a heat source in cooperative relation therewith and having a door hinged at one side thereof, a food supporting element mounted on the inside of said door for lateral swinging movement and biased in one direction, means mounted in said oven and toward which said element is biased for guiding said element during the closing of said door to a position in proper cooperative relation to the heat source when the door is closed, and means limiting the swing of said element in said direction when said door is open.

WILLIAM T. BRADBURY.